Figure 1:
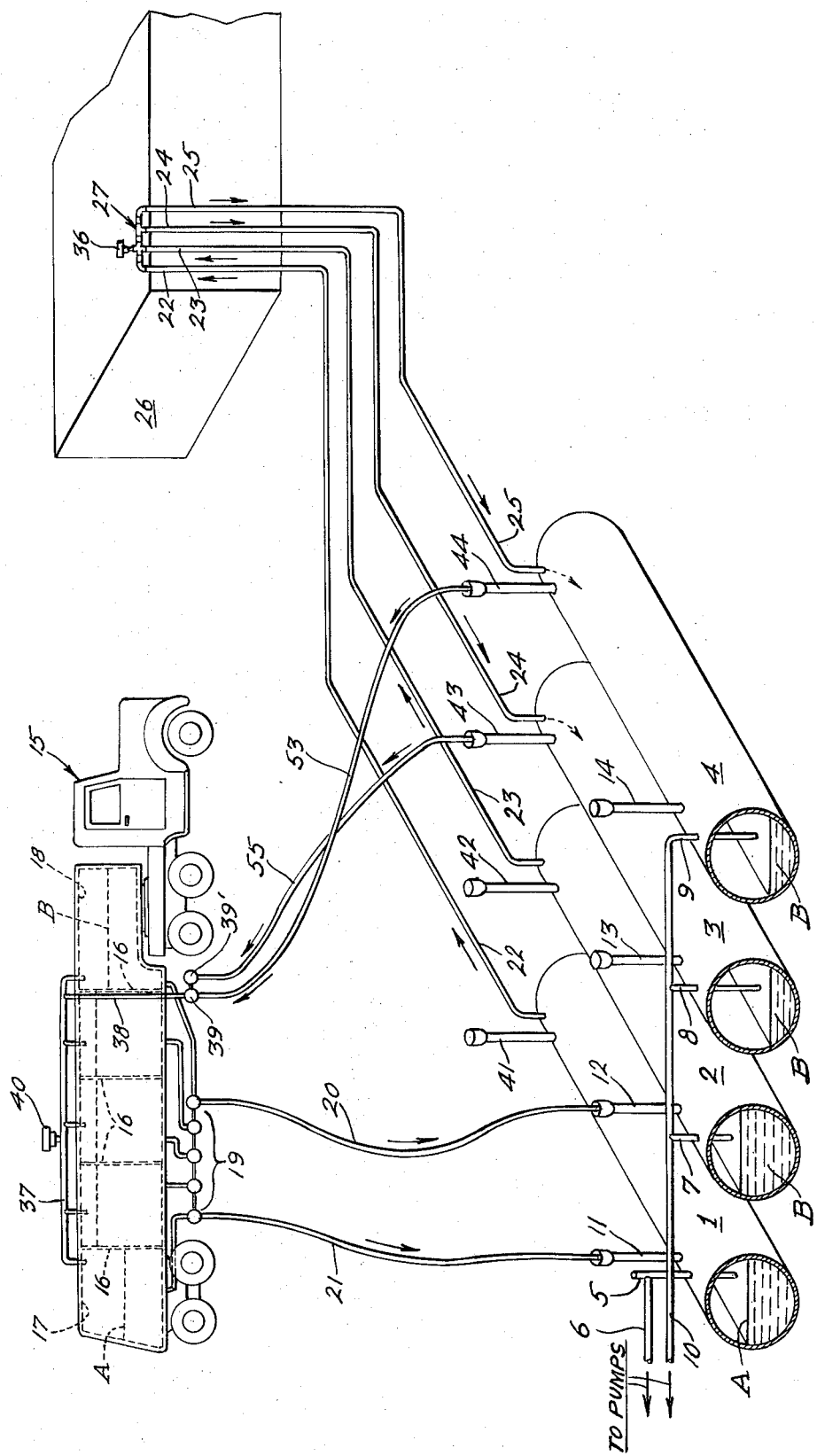

United States Patent [19]
Byrd

[11] 3,807,433

[45] Apr. 30, 1974

[54] SERVICE STATION VAPOR COLLECTION SYSTEM

[75] Inventor: Barney Raymond Byrd, Paoli, Pa.

[73] Assignee: Sun Oil Company of Pennsylvania, Philadelphia, Pa.

[22] Filed: Aug. 9, 1972

[21] Appl. No.: 278,888

[52] U.S. Cl.............................. 137/255, 141/290
[51] Int. Cl....................... F17c 3/00, F17c 13/00
[58] Field of Search.................... 137/255, 256, 257

[56] References Cited
UNITED STATES PATENTS
1,040,463  10/1912  Tokheim..................... 137/256 X Primary Examiner—Henry T. Klinksiek
Assistant Examiner—Robert J. Miller
Attorney, Agent, or Firm—George L. Church

[57] ABSTRACT

The vapors displaced from subterranean storage tanks at service stations, when liquid fuel (gasoline) is delivered into such tanks from a tank truck, are collected in the storage compartments of the tank truck by means of a closed piping system which interconnects the vapor spaces of the subterranean tanks and the vapor spaces of the tank truck storage compartments. Subsequently, the vapors so collected may be transported by the tank truck to a bulk plant or terminal and transferred to a vapor recovery unit at the terminal.

9 Claims, 3 Drawing Figures

SERVICE STATION VAPOR COLLECTION SYSTEM

This invention relates to a system for the recovery of hydrocarbon vapors, and more particularly to a system for the collection of hydrocarbon vapors from subterranean storage tanks at service stations.

At automobile service stations, the liquid fuels which are dispensed (such as gasoline) are stored in subterranean (underground) storage tanks, and each such tank is provided with an individual riser vent pipe the lower end of which communicates with the vapor space at the upper portion of the corresponding tank and the upper end of which is open to the atmosphere. The atmospheric ends of these pipes are located approximately 15 feet above grade, and the upper ends of the several pipes are placed close together, normally at the rear of the service station building.

Conventionally, when liquid fuel is delivered from a tank truck into a subterranean tank at a service station, vapors (which are always present in the vapor space at the upper portion of the tank, above the liquid, and which of course contain hydrocarbons) are forced by volume displacement through the tank's riser vent pipe into the atmosphere. This expulsion of hydrocarbon vapors into the atmosphere is obviously highly undesirable, from an ecological standpoint, and governmental regulations prohibiting such vapor emissions into the atmosphere are being promulgated.

An object of this invention is to provide a system for preventing the emission of hydrocarbon vapors from service station underground storage tanks into the atmosphere.

Another object is to provide a system for collecting the vapors displaced from subterranean storage tanks during the filling of such tanks.

A further object is to provide a system, operative during the filling of subterranean liquid fuel storage tanks from a tank truck, for conveying the vapors displaced from such storage tanks into the vapor space of the tank truck compartment from which the liquid fuel is being delivered into the storage tank.

A still further object is to provide a closed system for transferring the vapors displaced from a service station underground storage tank, during the filling of such tank from a tank truck, to such tank truck.

The objects of this invention are accomplished, briefly, in the following manner: The upper ends of all of the riser vent pipes at a service station are manifolded together, and a pressure/vacuum vent valve is installed between such manifold and the atmosphere. On the tank truck, the compartment vents are manifolded together and connected to a common header line to the lower end of which one end of a vapor return hose may be connected during delivery from the truck. The other end of this hose is connected during delivery through a vapor/liquid float valve to the gauge well of one of the underground tanks. For delivery of liquid fuel from the tank truck, an unloading hose is connected, in a conventional manner, to the tank truck unloading manifold and to the fill box of the subterranean tank into which fuel is to be delivered.

Figure 2:
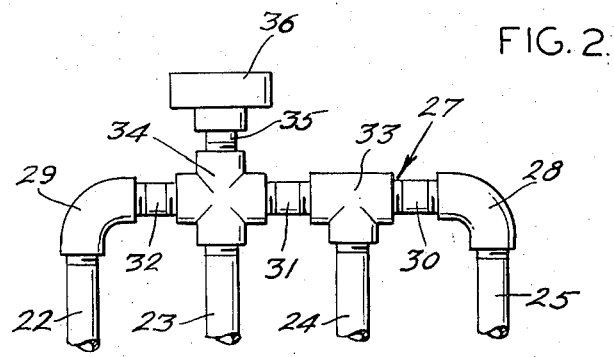
Figure 3:
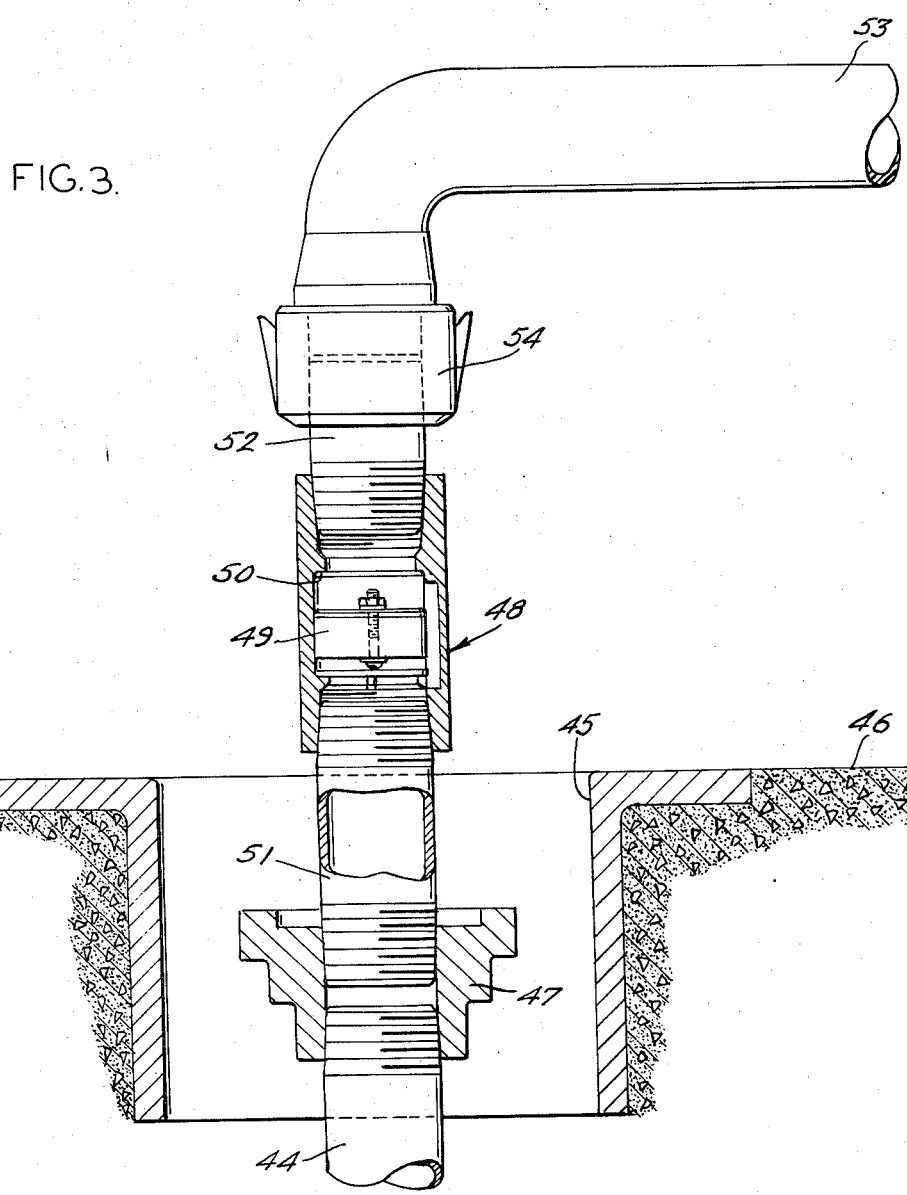

A detailed description of the invention follows, taken in conjunction with the accompanying drawings, wherein:

FIG. 1 is a schematic illustration of a vapor collection system according to this invention; and FIGS. 2 and 3 are fragmentary views, drawn on an enlarged scale, illustrating certain details of the system of FIG. 1.

First referring to FIG. 1, a service station is depicted as having, by way of example, four subterranean tanks 1, 2, 3, and 4 for the storage of liquid fuel (gasoline). The arrangement illustrated may be utilized for the storage (and subsequent dispensing) of two different grades of gasoline, tank 1 being utilized for the storage of gasoline A, and tanks 2, 3, and 4 being utilized for the storage of gasoline B. For dispensing of the gasoline, tank 1 is provided with the usual withdrawal pipe 5, which extends downwardly within this tank to a point near the bottom thereof, a pipe 6 being connected to pipe 5 for carrying the A gasoline to one or several remotely-located gasoline dispensing units (commonly termed "pumps"), not shown.

Tanks 2, 3, and 4 are provided with the similar withdrawal pipes 7, 8, and 9, respectively. The pipes 7–9 are connected together as indicated so as to provide a siphon arrangement, and a pipe 10 is connected to this siphon arrangement for carrying the B gasoline to one or several remotely-located gasoline dispensing units, not shown. The siphon arrangement on tanks 2–4 operates to equalize the liquid level in these three tanks during the normal withdrawal of B gasoline through the service station dispensing units; the arrangement will, of course, permit reverse flow, depending upon liquid level in each of the tanks 2–4.

Although the system of this invention is illustrated as being utilized for two different grades of gasoline, it is also applicable to more than two grades. In this latter case, separate suction lines (such as 10) from the underground tanks to the remotely located dispensers on the pump island would be required from tanks 2, 3, and/or 4, and, of course, only the tanks containing a common product would be siphoned (as at 7–9).

In FIG. 1, a conventional suction-type gasoline dispensing system is illustrated. The system of this invention, however, is applicable to submersible pumping arrangements. In arrangements of this latter type, the pumping unit is located inside the tank, at or near the bottom thereof, and is immersed in the product, with discharge lines running therefrom to remotely located dispensers.

The tanks 1–4 are provided with the usual, individual fillpipes 11, 12, 13, and 14, respectively (diameter three inches or four inches), which extend downwardly within the corresponding tanks to points near the bottom thereof, and which extend upwardly to fill boxes at the surface or "grade," as illustrated. By way of example, the fillpipes within each tank may have the form described in a copending application, Ser. No. 280,611, filed Aug. 14, 1972.

A tank truck, denoted generally by numeral 15, has a plurality of compartments (illustrated as five in number, separated by the partitions 16, schematically illustrated) for the storage and transportation of gasoline. The compartment 17 at one end of the truck may contain the A gasoline, and the compartment 18 at the opposite end of the truck may contain the B gasoline, as indicated. An arrangement 19 (schematically illustrated) of valves and pipes, constituting a typical tank truck manifold, enables gasoline to be delivered from any selected compartment of the truck 15. For delivery from the tank truck into the underground tanks, an unloading hose is connected to the fill box of an underground tank and to the tank truck unloading manifold 19 in the conventional manner; this is illustrated by the hose 20 which is connected to convy liquid fuel (gasoline B) from the lower portion of truck compartment 18 to the fillpipe 12 of subterranean tank 2.

The siphon arrangement described (which interconnects the pipes 7–9 of tanks 2–4) is not designed to permit filling all three of these tanks by way of only one connection (hose 20 connected as illustrated in FIG. 1) to the tank truck 15. When the storage capacity (for B gasoline) of the tank truck is greater than the volume of any one of the tanks 2–4, portions of the tank truck B gasoline load are unloaded or delivered into more than one underground tank (through surface connections such as provided by pipes 13 and 14), after which the siphon arrangement described will equalize any minor differences in liquid levels of the B gasoline tanks 2–4.

The tank truck 15 has the capability of unloading B gasoline and A gasoline simultaneously. This is illustrated in FIG. 1, wherein there is shown a (second) unloading hose 21 connected to convey A gasoline from the lower portion of truck compartment 17 to the fillpipe 11 of subterranean tank 1.

The tanks 1–4 are provided with the usual, individual vent riser pipes 22, 23, 24, and 25, respectively (diameter 1½ inches or 2 inches), which communicate at their inner (or lower) ends with the vapor space at the upper portion of the corresponding subterranean tank, and the outer (or upper) ends of the four pipes 22–25 extend approximately fifteen feet above grade to a location normally at the rear of the service station building 26; at this latter location, the upper ends of these pipes are close together.

According to prior practice, the upper ends of all four of these vent riser pipes 22–25 were open to the atmosphere. According to the present invention, however, the upper ends of all four of these vent pipes are manifolded together, as indicated generally by numeral 27. See FIG. 2, which illustrates details of the manifolding arrangement 27. The manifold may be made up of threaded or compression-type fittings, and could possibly be fabricated from approved non-metallic material; it is illustrated as comprising the pipe elbows 28 and 29, the pipe nipples 30, 31, and 32, the tee fitting 33, and the four-way tee fitting 34. To the fourth coupling of fitting 34 there is coupled, by way of a nipple 35, a pressure/vacuum vent valve 36 of conventional type (such valves being currently available), so that this valve 36 is in effect interposed between the manifold 27 and the atmosphere. The pressure portion of valve 36 is set at a predetermined pressure, say 1 or 2 psi, to prevent the emission of vapor to the atmosphere during the tank truck unloading into tanks 1–4. It has been found that the pressures in the underground tanks will be less than one-half psi during tank filling; hence, the vent valve 36 atop the manifolded vents does not open to atmosphere during tank filling.

The pressure/vacuum vent valve 36 also prevents formation of a partial vacuum in the subterranean tanks during product removal through the service station dispensing units (e.g., during use of pipes 6 and 10). By actual experience, it is known that product temperature (and pressure in the vapor space of a closed system, such as that being described herein) in underground tanks is fairly constant during stable conditions, that is, when product is neither being added nor removed. Hence, no unusual tank "breathing" will take place. The pressure side of the valve 36 therefore provides a safety feature, in the event that other portions of the vapor collection system being described are not functioning properly.

It may be noted that the only connection between the A gasoline tank 1 and the B gasoline tanks 2–4 is through the vent manifold 27. However, this vent manifold is approximately 15 feet above grade, which obviates any cross contamination of the A and B gasolines.

The tank truck 15 has, in each compartment, a separate vent valve (not shown) which communicates with the vapor space at the upper portion of that compartment. Each vent valve is connected by a linkage to the unloading valve (at manifold 19) for that same compartment, such that as the unloading valve for a given compartment is opened, the vent to that compartment is automatically opened, by way of the linkage previously described. The vent valve-linkage-unloading valve arrangement may be, for example, similar to that disclosed in the previously mentioned application. The outlet sides of all of the compartment vent valves are manifolded together, as indicated at 37, to provide a compartment vent-vapor manifold. The manifold 37 is connected to a common header line 38 which terminates at 39 with a 4 inch dry break-quick-connector type of fitting. A pressure/vacuum vent valve 40, which is preferably quite similar in construction to valve 36, is connected to manifold 37 in such a manner that it is in effect interposed between this manifold and the atmosphere. The vacuum portion of valve 40 is set so that this valve does not open to atmosphere during the unloading or delivery from the tank truck. This is easily possible, since it has been found, by actual tests that at a delivery rate or drop rate (from the tank truck) of 200 gallons per minute, the vacuum developed in the tank truck is only about 0.004 psig. (It may be noted here that in actual service the delivery or drop rate is commonly in the range of 300 to 400 gallons per minute.)

A fitting 39', exactly similar to fitting 39, may be manifolded to fitting 39, so that fitting 39' is also coupled to header line 38.

Refer now also to FIG. 3. The tanks 1–4 are provided with the usual, individual gauge lines or gauge wells 41, 42, 43, and 44, respectively (diameter normally 2 inches), which extend downwardly from fill boxes such as 45 (FIG. 3) at the surface or grade 46 to the vapor spaces at the upper portions of the corresponding tanks. At its upper end, each of the gauge wells (such as 44, FIG. 3) carries a fitting such as 47 which has a set of female pipe threads.

According to the invention, a more or less conventional vapor/liquid float valve 48, which will permit the passage of vapors upwardly therethrough but will not permit the passage of liquid in this same direction, is utilized. The valve 48 contains an internal float 49 which is moved upwardly by a liquid to seal against an internal seat 50. The valve 48 acts as a safety device, to prevent liquid being forced back into the tank truck 15 in the event of human error in overfilling the underground tanks. To enable the valve 48 to be connected into a service station gauge well such as 44, 47, a short length of 2 inch diameter pipe is threaded into each end of the valve. At the lower end of the valve 48, one end of a pipe nipple 51, which is threaded on both ends, is threaded into the valve, and the other end of this pipe nipple is adapted to be threaded into the fitting 47 at the upper end of the gauge well, inside box 45. At the upper end of the valve 48, the lower end of a short piece of pipe 52, whose lower end is threaded but whose upper end is plain, is threaded into the valve. The upper end of pipe 52 is adapted to be coupled to one end of a 2 inch light-weight vapor return hose 53 which carries a quick-connector fitting 54, schematically illustrated. As its other end the hose 52 has a 4 inch adapter and a quick-connector fitting which is adapted to mate with the 4 inch fitting 39 on the tank truck 15.

The scheme or plan of operation of the system of this invention will now be set forth. (1) The unloading or delivery hose 20 is connected to the fill box or fillpipe 12 of the underground tank 2 and to the tank truck unloading manifold 19 in the conventional manner. (2) The lower end of the vapor/liquid float valve-adapter assembly 48, 51, 52 is threaded into the existing well fitting 47 of the underground tank 4. (3) The vapor return hose 53 is connected to the compartment vapor-vent manifold 37, 38, at 39, and to the upper end of the vapor/liquid float valve-adapter assembly.

It is pointed out, at this juncture, that the truck piping and the service station tank piping together form a closed system, for delivering liquid from the tank truck to an underground tank and for concomitantly collecting vapors from the underground tank.

As the unloading valve on the tank truck 15 is opened for a given compartment, say compartment 18, linkage automatically opens the vent valve at the upper portion of that compartment. The liquid fuel (B gasoline) then flows by gravity out of compartment 18 through the unloading hose 20 into underground tank 2. As the liquid level rises in the subterranean tank 2, vapors are forced by volume displacement through a flow conduit comprising vent pipe 23 of tank 2, vent manifold 27, vent pipe 25 of the idle companion tank 4, a portion of the vapor space of tank 4, gauge well 44, vapor/liquid float valve 48, vapor return hose 53, header line 38, and compartment vent-vapor manifold 37, into the vapor space of the compartment 18 being unloaded. As the liquid level recedes in the truck compartment 18, a partial vacuum is created which, coupled with the slight pressure created in the underground tank 2, assists in the movement of the vapors from the underground tank into the truck compartment.

As each truck compartment is emptied, the unloading valve for that compartment is closed, causing the closing of the vent valve for that compartment by means of the linkage previously described. Thus, the vapors are contained in the truck compartments.

The foregoing description describes the returning of the vapors through an idle companion tank 4; however, if desired or local conditions dictate, the vapor return hose 53 could be connected to the gauge well of the tank being filled, which in the example would be gauge well 42 of tank 2.

More than one vapor return hose (from the subterranean tanks to the tank truck) may be used, as local delivery rates or other conditions dictate. For example, if A gasoline is unloaded (from truck compartment 17, by way of hose 21, into subterranean tank 1) simultaneously with B gasoline, two 2-inch vapor return hoses would be required. Such a second vapor return hose 55 is illustrated in FIG. 1, connected between the gauge well 43 of subterranean tank 3 and the manifolded vapor return fitting 39' on tank truck 15. In this case, vapors displaced from subterranean tank 1, as a result of the delivery thereinto of A gasoline, pass through vent pipe 22, vent manifold 27, vent pipe 24, vapor space of tank 3, gauge well 43, hose 55, and the truck manifolding system 38, 37 into the vapor space of truck compartment 17.

However, if only one product, B gasoline, is unloaded at a time, then only the one 2 inch vapor return hose 53 would be required; in this latter case, of course, the unloading hose 21 would not be utilized.

Upon completion of delivery, the hoses and the float valve-adapter assembly are disconnected and stored on the tank truck and the truck returns to the bulk plant or terminal.

At the terminal, the trucks may be laoded by utilizing bottom or top loading procedures. If bottom loading is utilized, as disclosed in the aforementioned application, the loading spouts are connected to the tank truck manifold fittings at 19, and the terminal vapor return line is connected to the compartment vent-vapor header fitting 39. As liquid is loaded into the truck compartments, the stored vapors (which have been transported from the service station to the terminal in the tank truck) are forced by volume displacement into the truck compartment vent-vapor manifold system 37, 38, and thence into the terminal vapor recovery unit.

If top loading is utilized, the loading spout, equipped with a tapered plug, is inserted into the compartment manhole at the top of the truck. The tapered plug forms a tight seal against the manhole, to prevent vapor emission to the atmosphere. The terminal vapor return line is connected as with bottom loading. Here again, as each compartment is loaded, the liquid forces the stored vapors into the compartment vent-vapor manifold system, and thence into the terminal vapor recovery unit.

In both the bottom and top loading procedures at the terminal, the pressures developed inside the truck compartment vapor spaces, during liquid loading, are insufficient to open the pressure/vacuum vent valve 40, so that a closed system for vapor collection is again formed, and no vapors are emitted to the atmosphere. It is easily possible to set the pressure portion of valve 40 so that this valve does not open during tank truck loading. It has been found, by actual tests, that at a tank truck bottom loading rate of 536 gallons per minute, the pressure developed in the tank truck compartments is only about 0.047 psig. (It may be noted here that, in service, the tank truck loading rate for bottom loading is normally around 600 gallons per minute per compartment, and normally two compartments are loaded simultaneously. For top loading, the service rate may range from 400 to 1,000- plus gallons per minute, and normally only one compartment is loaded at a time.)

The invention claimed is:

1. A closed system for delivering liquid from a tank truck compartment to a selected one of a pluraity of subterranean tanks and for concomitantly collecting vapors from said one tank, comprising a first flow conduit extending between the lower portion of said truck compartment and the lower portion of said one tank, said conduit being constructed and arranged to convey liquid only from said truck compartment to said one tank; a separate riser vent pipe communicating at its inner end with the vapor space at the upper end of each corresponding tank, means manifolding the outer ends of all of said vent pipes together, and means coupling the vapor space at the upper portion of a chosen one of said tanks to the vapor space at the upper portion of said truck compartment, whereby the flow of liquid through said first conduit from said truck compartment into said selected one tank forces vapors to flow from the vapor space of the last-mentioned tank to the vapor space of said truck compartment.

2. Combination according to claim 1, wherein the system includes a plurality of compartments in said tank truck from a selected one of which liquid may be delivered to said selected one tank, and wherein the last-mentioned means comprises a separate vent valve communicating with the vapor space at the upper portion of each corresponding compartment, means manifolding the outlet sides of all of said vent valves together, and means coupling the vapor space at the upper portion of said chosen one tank to the manifolded sides of said vent valves.

3. Combination of claim 1, including also a pressure/vacuum vent valve connected to the manifolded ends of said vent pipes.

4. Combination of claim 1, including also a float valve in said direct coupling means for positively preventing the flow of liquid through such means toward said truck compartment.

5. Combination set forth in claim 6, including also a pressure/vacuum vent valve connected to the manifolded ends of said vent pipes.

6. Combination of claim 2, including also a pressure/vacuum vent valve connected to the manifolded sides of said vent valves.

7. Combination of claim 2, including also a pressure/vacuum vent valve connected to the manifolded ends of said vent pipes.

8. Combination of claim 2, including also a pressure/vacuum vent valve connected to the manifolded ends of said vent pipes, and a pressure/vacuum vent valve connected to the manifolded sides of said vent valves.

9. Combination set forth in claim 8, including also a float valve in the coupling between the vapor space of said chosen one tank and the manifolded sides of the vent valves, for positively preventing the flow of liquid through such coupling toward the manifolded sides of the vent valves.

* * * * *